United States Patent
Lee et al.

(10) Patent No.: US 10,976,251 B2
(45) Date of Patent: Apr. 13, 2021

(54) SURFACE PLASMON RESONANCE SENSOR COMBINED WITH NANOSTRUCTURE

(71) Applicant: Industry-Academic Cooperation Foundation, Dankook University, Gyeonggi-do (KR)

(72) Inventors: Seung-Ki Lee, Seoul (KR); Hyeong-Min Kim, Gyeonggi-do (KR); Jae-Hyoung Park, Gyeonggi-do (KR)

(73) Assignee: Industry-Academic Cooperation Foundation, Dankook University, Gyeonggi-do (KR)

( * ) Notice: Subject to any disclaimer, the term of this patent is extended or adjusted under 35 U.S.C. 154(b) by 2 days.

(21) Appl. No.: 16/535,444

(22) Filed: Aug. 8, 2019

(65) Prior Publication Data
US 2021/0041357 A1 Feb. 11, 2021

(30) Foreign Application Priority Data
Aug. 6, 2019 (KR) .......................... 10-2019-0095732

(51) Int. Cl.
*G01N 21/552* (2014.01)

(52) U.S. Cl.
CPC ... *G01N 21/554* (2013.01); *G01N 2201/0846* (2013.01)

(58) Field of Classification Search
CPC .............. G01N 21/554; G01N 21/59; G01N 33/54373; G01N 33/54346; G01N 33/553; G01N 2201/0846; G01N 15/1436; G01N 2015/0065
See application file for complete search history.

(56) References Cited

U.S. PATENT DOCUMENTS

| | | | | |
|---|---|---|---|---|
| 9,075,009 B2* | 7/2015 | Kim | ................. | G01N 21/552 |
| 9,103,775 B2* | 8/2015 | Bradley | ............. | H01L 29/0665 |
| 9,859,494 B1* | 1/2018 | Cao | .................... | H01L 49/02 |
| 2010/0243020 A1* | 9/2010 | Norton | .................... | H01L 31/06 |
| | | | | 136/244 |
| 2010/0323173 A1* | 12/2010 | Van Roy | ................ | B82Y 30/00 |
| | | | | 428/208 |
| 2011/0003279 A1* | 1/2011 | Patel | ..................... | G01D 7/00 |
| | | | | 435/5 |
| 2011/0109902 A1* | 5/2011 | Lin | ...................... | G01N 21/658 |
| | | | | 356/301 |
| 2011/0116093 A1* | 5/2011 | Liu | ..................... | G01N 21/0303 |
| | | | | 356/432 |

(Continued)

FOREIGN PATENT DOCUMENTS

| | | |
|---|---|---|
| KR | 10-1617148 B1 | 1/2016 |
| KR | 10-2016-0038207 A | 4/2016 |
| KR | 10-1847745 B1 | 4/2018 |

*Primary Examiner* — Sang H Nguyen
(74) *Attorney, Agent, or Firm* — Meunier Carlin & Curfman LLC

(57) ABSTRACT

Disclosed is a surface plasmon resonance sensor. The surface plasmon resonance sensor includes an optical fiber; a microfiber provided at an end of the optical fiber; and a nanostructure provided in a specific region of the microprobe. The specific region of the microprobe is present at a position separate by a predetermined distance from the end of the optical fiber, and, in the nanostructure, a conductive layer is provided at an interval of a nano size at each of both sides of an insulating layer.

8 Claims, 15 Drawing Sheets

(56) References Cited

U.S. PATENT DOCUMENTS

| | | | |
|---|---|---|---|
| 2011/0166045 A1* | 7/2011 | Dhawan | G01N 21/554 506/39 |
| 2011/0176130 A1* | 7/2011 | Gu | G02B 6/02385 356/301 |
| 2011/0267607 A1* | 11/2011 | Hu | G01N 21/658 356/301 |
| 2013/0017553 A1* | 1/2013 | Orwar | G01N 33/48728 435/7.1 |
| 2013/0168536 A1* | 7/2013 | Guo | G02B 1/005 250/216 |
| 2013/0214244 A1* | 8/2013 | Sanborn | H01J 1/304 257/10 |
| 2013/0260113 A1* | 10/2013 | Hart | B32B 3/22 428/201 |
| 2014/0356411 A1* | 12/2014 | Fan | G01N 33/552 424/443 |
| 2015/0369744 A1* | 12/2015 | Yang | G01N 21/658 356/301 |
| 2016/0370290 A1* | 12/2016 | Raphael | G01N 21/6458 |
| 2017/0328836 A1* | 11/2017 | Lu | G02B 6/032 |
| 2018/0231418 A1* | 8/2018 | Park | G01J 3/44 |

* cited by examiner (1) Photo etching (3) Silicon isotropic etching (2) Silicon anisotropic etching (4) Embossed mold through PDMS coating (9) Expose end of microprobe using dry etching

(10) Sequential deposition of
gold-parylene-gold-parylene-gold for manufacturing
nanostructure and interval of nano size

(11) Lift-off process through etching of photo sensitizer (9) Expose end of microprobe using flowing of dry etching

(10) Sequential deposition of
gold-parylene-gold-parylene-gold for manufacturing
nanostructure and interval of nano size

(11) Lift-off process through etching of photo sensitizer

SURFACE PLASMON RESONANCE SENSOR COMBINED WITH NANOSTRUCTURE

CROSS-REFERENCE TO RELATED APPLICATION(S)

This application claims the priority benefit of Korean Patent Application No. 10-2019-0095732 filed on Aug. 6, 2019, in the Korean Intellectual Property Office, the disclosure of which is incorporated herein by reference for all purposes.

BACKGROUND

1. Field

One or more example embodiments of the following description relate to a surface plasma resonance sensor combined with a nanostructure.

2. Description of Related Art

A surface plasmon resonance phenomenon occurs due to collective vibration of free electrons when incident light reacts to metal thin films, such as gold or silver, or nanoparticles or nanostructures.

The surface plasmon resonance phenomenon has been applied to biosensors capable of analyzing protein chips and measuring various bioreactions by measuring reactions between biomaterials in real time without using a specific indicator. Such a surface plasmon resonance sensor may be utilized for various measurements, for example, specific binding between proteins through the surface plasmon resonance phenomenon.

SUMMARY

At least one example embodiment provides a surface plasmon resonance sensor in which a nanostructure is provided on the surface of an optical fiber.

At least one example embodiment also provides a surface plasmon resonance sensor that may enhance a sensitivity by a nanostructure having a specific structure and may also increase a hotspot effect.

According to an aspect of at least one example embodiment, there is provided a surface plasmon resonance sensor including an optical fiber; and at least one nanostructure provided at a position separate by a predetermined distance from an end of the optical fiber. The nanostructure includes a conductive layer and an insulating layer.

A microprobe may be provided at the end of the optical fiber, and the nanostructure may be provided in a specific region of the microprobe.

The specific region may be at a position separate by the predetermined distance from the end of the optical fiber.

In the nano structure, the conductive layer may be provided at an interval of a nano size at each of both sides of the insulating layer.

The nanostructure may be positioned in a specific region of the microprobe provided at an end of a core layer of the optical fiber.

According to an aspect of at least one example embodiment, there is provided a surface plasmon resonance sensor including an optical fiber; a microfiber provided at an end of the optical fiber; and a nanostructure provided in a specific region of the microprobe. The specific region of the microprobe is present at a position separate by a predetermined distance from the end of the optical fiber, and in the nanostructure, a conductive layer is provided at an interval of a nano size at each of both sides of an insulating layer.

The microprobe may be provided in a core layer at the end of the optical fiber.

According to an aspect of at least one example embodiment, there is provided a measurement apparatus including a channel unit including at least one inlet and at least one outlet; and a surface plasmon resonance sensor provided to the channel unit. The surface plasmon resonance sensor includes an optical fiber; a microfiber provided at an end of the optical fiber; and a nanostructure provided in a specific region of the microprobe present at a position separate by a predetermined distance from the end of the optical fiber.

The nanostructure may include an insulating layer and a conductive layer, and the conductive layer may be provided at an interval of a nano size at each of both sides of the insulating layer.

The microprobe may be provided in a core layer at the end of the optical fiber.

According to some example embodiments, it is possible to perform various measurements by combining an antibody reacting to a specific antigen through a surface plasmon resonance sensor in which a nanostructure is provided on the surface of an optical fiber.

According to some example embodiments, a sensitivity of a surface plasmon resonance sensor may be enhanced and a hotspot effect may increase through a nanostructure provided on the surface of an optical fiber.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
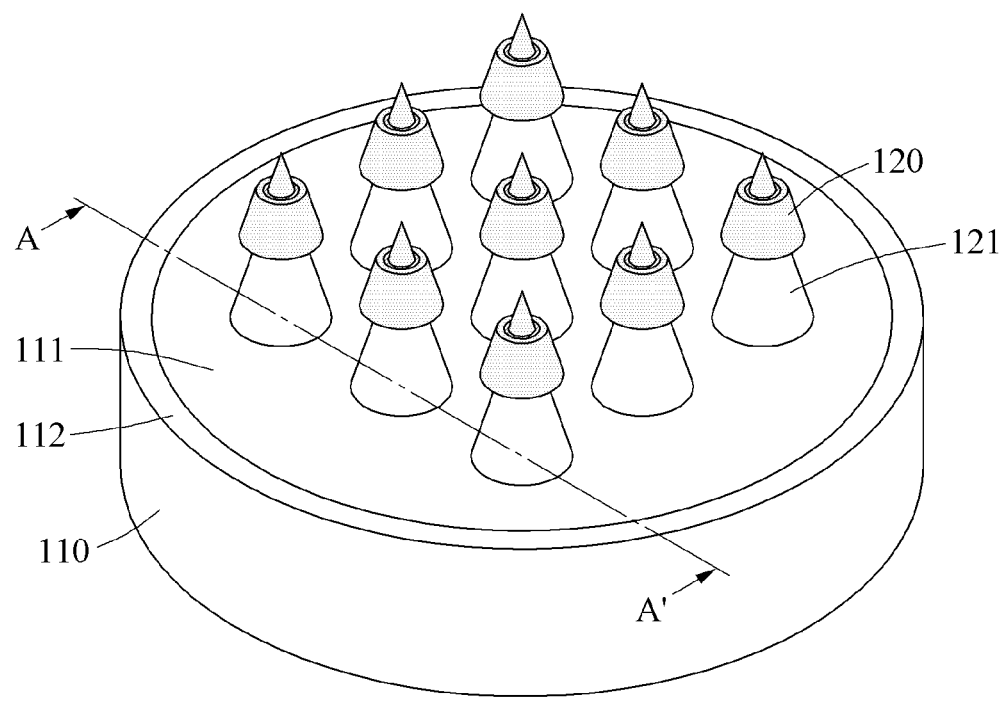
FIG. 1A is a perspective view of a surface plasmon resonance sensor according to an example embodiment.
FIG. 1B is a cross-sectional view of the surface plasmon resonance sensor of FIG. 1A cut along line A-A' according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings.

The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component. On the contrary, it should be noted that if it is described that one component is "directly connected", "directly coupled", or "directly joined" to another component, a third component may be absent. Expressions describing a relationship between components, for example, "between", "directly between", or "directly neighboring", etc., should be interpreted to be alike.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Also, in the description of embodiments, detailed description of well-known related structures or functions will be omitted when it is deemed that such description will cause ambiguous interpretation of the present disclosure.

Hereinafter, the example embodiments will be described with reference to the accompanying drawings.

Figure 1B:
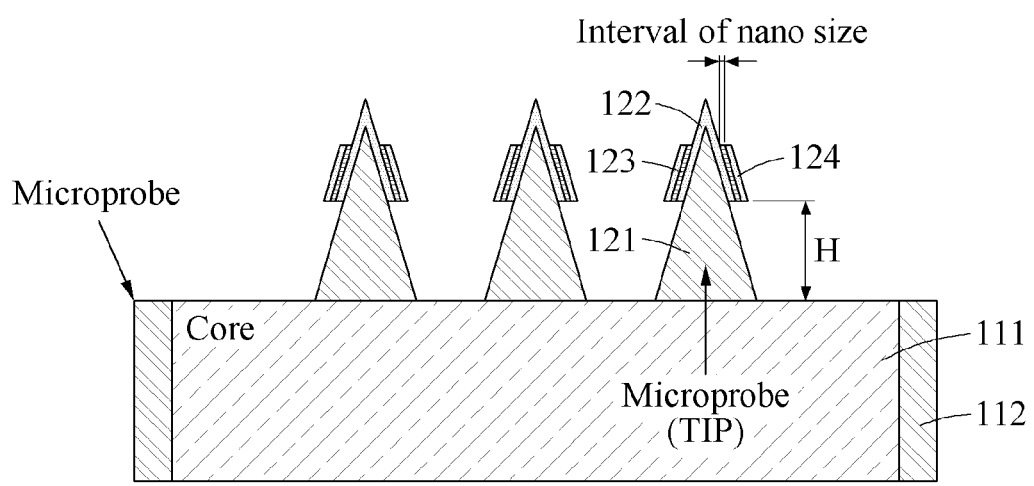

FIG. 1A is a perspective view of a surface plasmon resonance sensor according to an example embodiment, and FIG. 1B is a cross-sectional view of the surface plasmon resonance sensor of FIG. 1A cut along line A-A' according to an example embodiment.

A surface plasmon resonance phenomenon occurs due to collective vibration of free electrons when incident light reacts to metal thin films, such as gold or silver, or nanoparticles or nanostructures. The surface plasmon resonance is applicable to a biosensor capable of analyzing protein chips and measuring various bioreactions since it is possible to measure reactions between biomaterials in real time without using a specific indicator. A surface plasmon resonance sensor refers to a sensor using the surface plasmon resonance phenomenon. The surface plasmon resonance sensor may be used to measure specific binding between proteins through an output signal by reaction between an antibody adsorbed onto the surface of a sensor and an antigen that is an object to be analyzed.

A surface plasmon resonance sensor according to an example embodiment may include a nanostructure 120 at an end of an optical fiber 110. The optical fiber 110 may be dived into a core layer 111 and a cladding layer 112. Light may move through total reflection in the core layer 111 of the optical fiber 110.

Here, the nanostructure 120 may be provided to a microprobe 121 that is provided in the core layer 111 of the optical fiber 110. In detail, referring to FIG. 1B, the nanostructure 120 may be provided in a specific region of the microprobe 121.

Referring to FIG. 1B, the nanostructure 120 is configured by providing an insulating layer 123 between a conductive layer 122 and another conductive layer 124. Here, the conductive layer 122 and the conductive layer 124 are separate from each other at an interval of a nano size and the insulating layer 123 is provided between the conductive layer 122 and the conductive layer 124. Here, the conductive layer 122 and the conductive layer 124 may be formed using an electrically conductive metal material, for example, gold, silver, and copper. The insulating layer 123 may be formed using an insulative polymer, for example, parylene. That is, a hotspot effect may be maximized by maintaining the interval of the nano size between the conductive layer 122 and the conductive layer 124 formable using a metal material.

Although it is described herein that the nanostructure 120 includes two conductive layers 122 and 124 and a single insulating layer 123 therebetween, it is provided as an example only. That is, the nanostructure 120 may also represent a structure in which a plurality of structures in which the insulating layer 123 is provided between the conductive layer 122 and the conductive layer 124 is stacked.

Referring to FIGS. 1A and 1B, the microprobe 121 is provided in the core layer 111 of the optical fiber 110 and the nanostructure 120 is provided in a specific region of the microprobe 121. The microprobe 121 may include a polymer. Although the microprobe 121 is in a conic shape in FIG. 1A, any structures capable of including the nanostructure 120 may apply.

Here, the specific region of the microprobe 121 is at a position separate by a predetermined distance H from the end of the optical fiber 110. That is, the nanostructure 120 may be provided at a position separate by a predetermined distance from the end of the optical fiber 110, which may lead to reducing a degradation in sensitivity.

For example, the conductive layer 122 and the conductive layer 124 may be formed of a metal, and the insulating layer 123 may be formed of parylene. The insulating layer 123 may have a thickness of a nano size, and accordingly, the conductive layer 122 and the conductive layer 124 may be separate from each other at an interval corresponding to the nano size.

Also, during a manufacturing process, the nanostructure 120 including the conductive layer 122, the insulating layer 123, and the conductive layer 124 is separate by the predetermined distance H from the end of the core layer 111 of the optical fiber 110. That is, since the nanostructure 120 is separate by the predetermined distance from the surface of the end of the optical fiber 120, it is possible to reduce a degradation in the sensitivity of the surface plasmon resonance sensor. Also, since the insulating layer 123 with the thickness of the nano size is provided between the conductive layer 122 and the conductive layer 124, the interval of the nano size may be maintained between the conductive layer 122 and the conductive layer 124 and accordingly, a hotspot effect may be maximized A process of manufacturing the nanostructure 120 is further described with reference to the accompanying drawings.

Light that moves through total reflection inside the optical fiber 110 may be reflected through reaction to the nanostructure 120 adsorbed onto the surface of the optical fiber 110 and the reflected light may be measured through a detector. Here, when an antibody and an antigen are bound, a signal strength of the reflected light may vary and an amount of bound antibody-antigen may be determined based on a change in signal strength between before and after the binding. For example, when the antibody is adsorbed at an upper end of the nanostructure 120, the reflected signal strength of incident light through the optical fiber 110 may be measured. Also, when the antibody and the antigen are bound at the upper end of the nanostructure 120, the reflected signal strength of incident light through the optical fiber 110 may be measured. Accordingly, whether a specific antigen is present and an amount of bound antibody-antigen may be determined based on a change in the reflected signal strength.

Here, to enhance the ability of receiving the reflected light, for example, a multimode optical fiber with a core diameter of 105 μm and a cladding diameter of 125 μm may be used to receive a relatively wide surface of the surface plasmon resonance sensor and light through a plurality of paths. Also, a jacket of the optical fiber 110 may be removed by a predetermined length, using an optical fiber stripper.

The antibody may be adsorbed at the upper end of the nanostructure 120. Here, a different antibody may be adsorbed at an upper end of each nanostructure 120. For example, an antibody adsorbed at an upper end of a single nanostructure 120 and an antibody adsorbed at an upper end of another nanostructure 120 may bind with different antigens, respectively. In detail, when the surface plasmon resonance sensor is in contact with blood, different types of antigens present in the blood may be detected using sensors onto which different antibodies are adsorbed and presence/absence of disease may be determined.

Figure 2A:
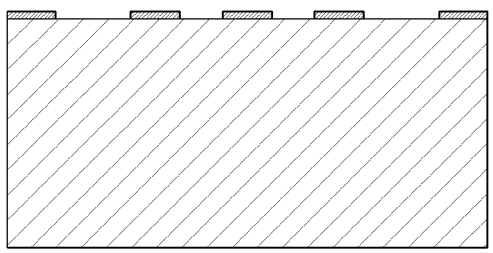
FIGS. 2A to 2C illustrate a manufacturing process of a surface plasmon resonance sensor according to an example embodiment.
Figure 2A:
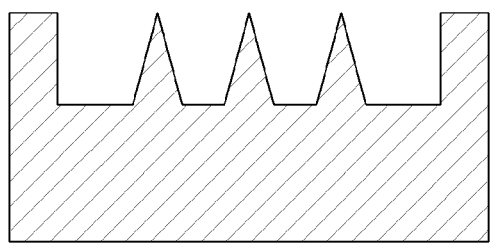
Figure 2A:
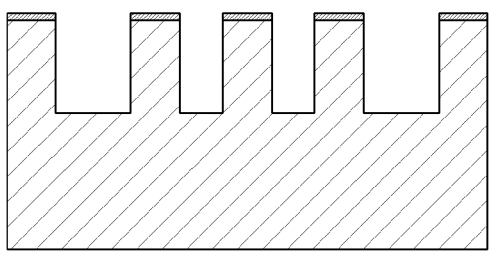
Figure 2A:
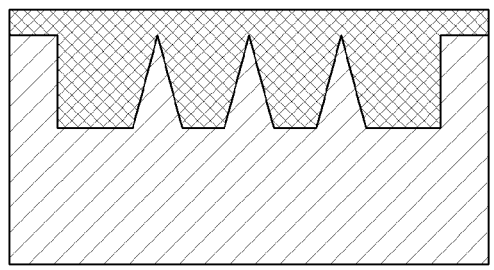
Figure 2A:
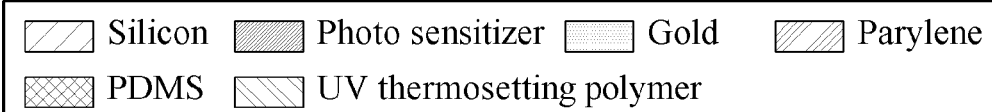
Figure 2B:
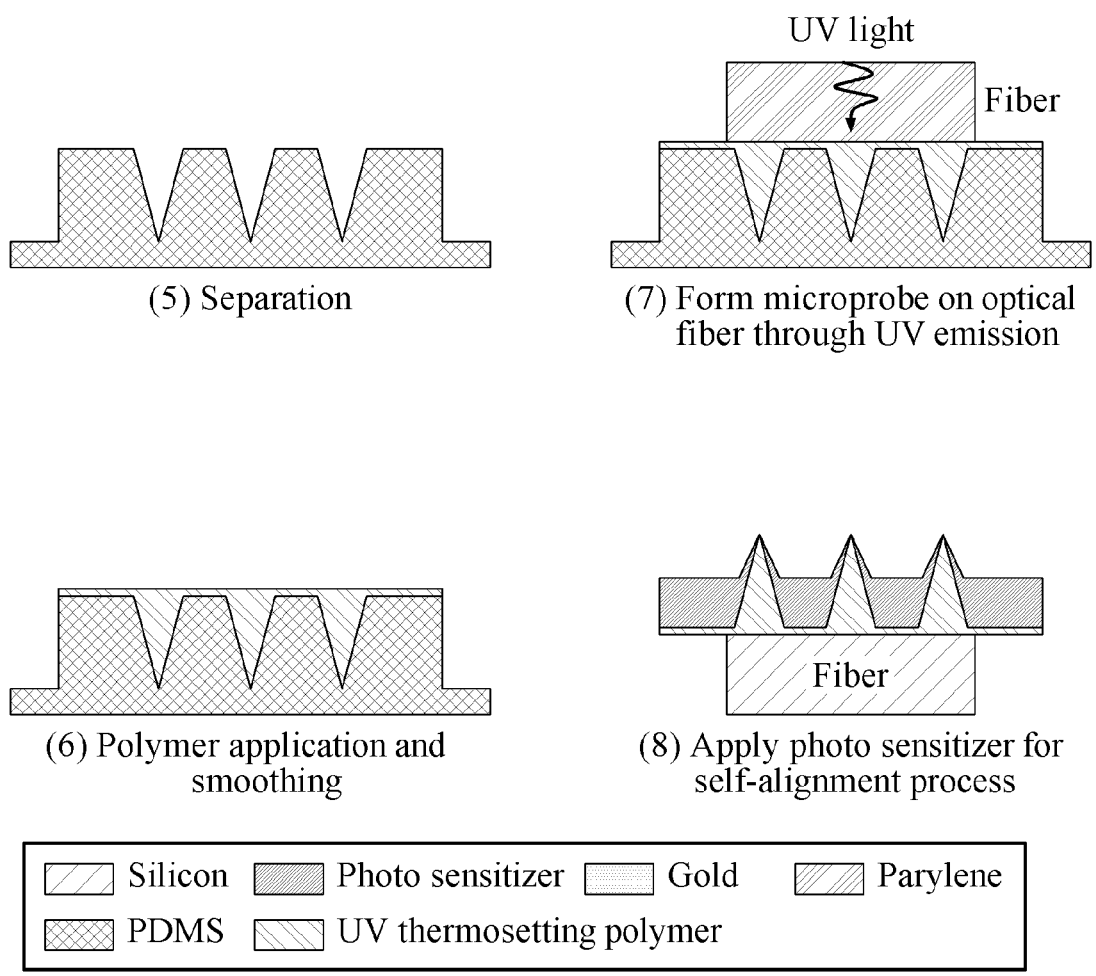
Figure 2C:
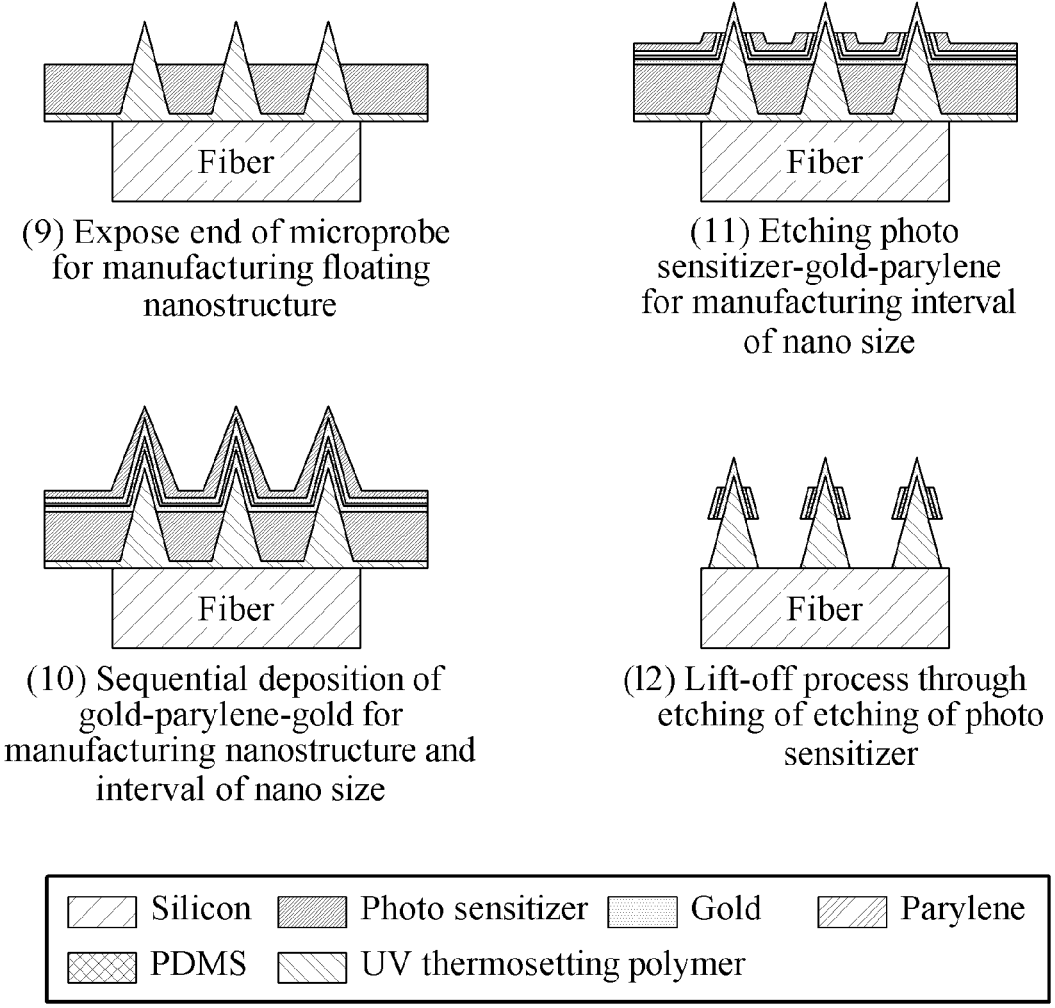

FIGS. 2A to 2C illustrate a manufacturing process of a surface plasmon resonance sensor according to an example embodiment.

Referring to FIG. 2A, in process (1), after a photo sensitizer is applied on silicon, a pattern is formed through a general photo-etching process. In process (2), cylinders are formed through silicon anisotropic etching having an etching speed different in each of a vertical direction and a horizontal direction with respect to the pattern. In process (3), silicon isotropic etching having the same etching speed in each of the vertical direction and the horizontal is performed. A microprobe in a conic shape may be formed through the silicon isotropic etching.

Here, a distance between microprobes and a height thereof may be adjusted. For example, a height of the microprobe through silicon anisotropic etching and a height of the microprobe through silicon isotropic etching may differ from each other. Also, a distance between microprobes may differ for each of pattern formation and silicon anisotropic etching.

In process (4), embossed molding through polydimethylsiloxane (PDMS) coating is performed on process (3).

Referring to FIG. 2B, in process (5), the formed embossed mold is removed. In process (6), a polymer application and smoothing process is performed on process (5). Here, the polymer may be, for example, an ultraviolet (UV) thermosetting polymer. In process (7), a microprobe is formed on an optical fiber through UV emission.

In process (8), the photo sensitizer for a self-alignment process is applied on the microprobe formed on the optical fiber. Here, the self-alignment process refers to selective etching technique using a structure of a microprobe in which the photo sensitizer is applied thinly at an end of the microprobe. The end of the microprobe may be exposed without additional masking through the self-alignment process and a length of the end being exposed may be adjusted by adjusting an etching time and microprobes having different lengths of ends to be exposed may be formed.

Here, a distance between a nanostructure including conductive layer-insulating layer-conductive layer on the surface of the optical fiber and the surface of the end of the optical fiber may be determined based on the length of the exposed end of the microprobe.

For example, when the length of the exposed end of the microprobe is relatively long, a distance from the surface of the end of the optical fiber to the nanostructure including conductive layer-insulating layer-conductive layer may decrease. For example, the conductive layer may be formed of gold and the insulating layer may be formed of parylene. However, it is provided as an example only. When the length of the exposed end of the microprobe is relatively short, the distance from the surface of the end of the optical fiber to the nanostructure including conductive layer-insulating layer-conductive layer may increase.

Referring to FIG. 2C, in process (9), the portion applied thinly at the end of the microprobe is removed through the self-alignment process to separate the nanostructure including conductive layer-insulating layer-conductive layer from the surface of the optical fiber. In process (10), after sequentially depositing conductive layer-insulating layer-conductive layer, the photo sensitizer is applied on the last deposited conductive layer.

In process (11), an etching process for maintaining an interval of a nano size between the conductive layers is performed. In detail, the conductive layers may be separate from each other at an interval corresponding to the thickness of the insulating layer. That is, when the thickness of the insulating layer corresponds to the nano size, the conductive layer and the other conductive layer may be separate at the interval corresponding to the nano size.

In process (12), a lift-off process through photo sensitizer etching is performed. Here, lift-off refers to a processing technique for removing only an undesired portion using the photo sensitizer. In detail, only the nanostructure including conductive layer-insulating layer-conductive layer in contact with the microprobe may remain through process (12).

Figure 2D:
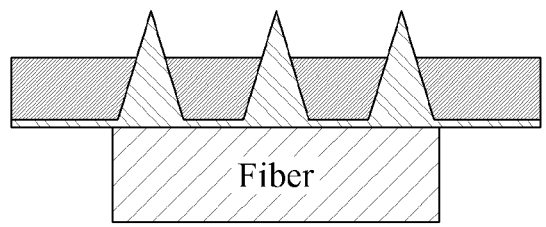
FIG. 2D illustrates a modified example of the manufacturing process of FIG. 2C.
Figure 2D:
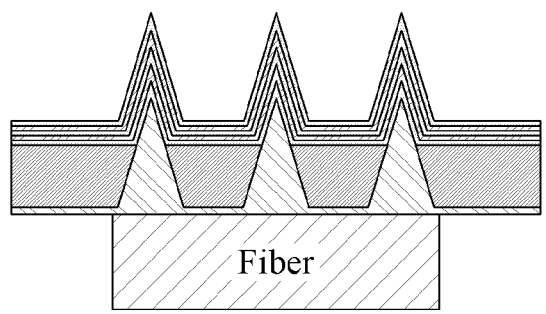
Figure 2D:
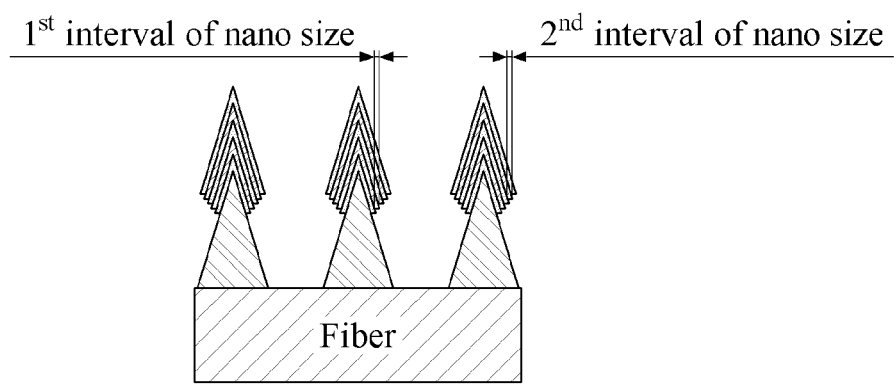
Figure 2D:
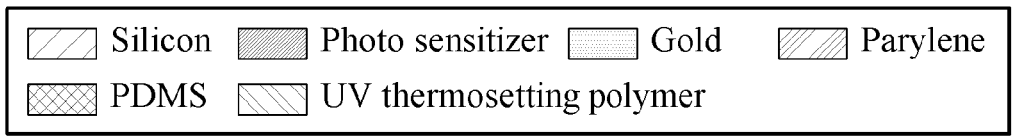

FIG. 2D illustrates a modified example of the manufacturing process of FIG. 2C.

FIG. 2D illustrates a process that proceeds after the manufacturing process of FIGS. 2A and 2B is completed. Referring to FIG. 2D, an end of a probe is exposed through dry etching in process (9), and sequential deposition, such as gold-parylene-gold, is performed to manufacture a nanostructure and an interval of a nano size in process (10). Here, gold-parylene-gold correspond to conductive layer-insulating layer-conductive layer, respectively. In process (11), a lift-off process is performed through etching of photo sensitizer.

Figure 2E:
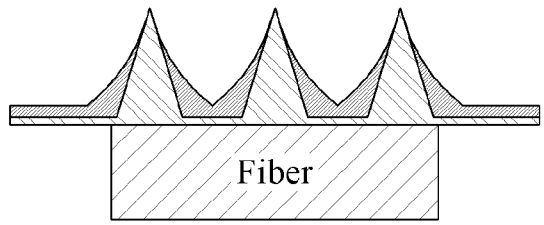
FIG. 2E illustrates another modified example of the manufacturing process of FIG. 2C.
Figure 2E:
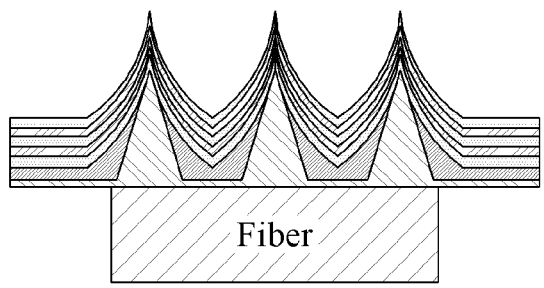
Figure 2E:
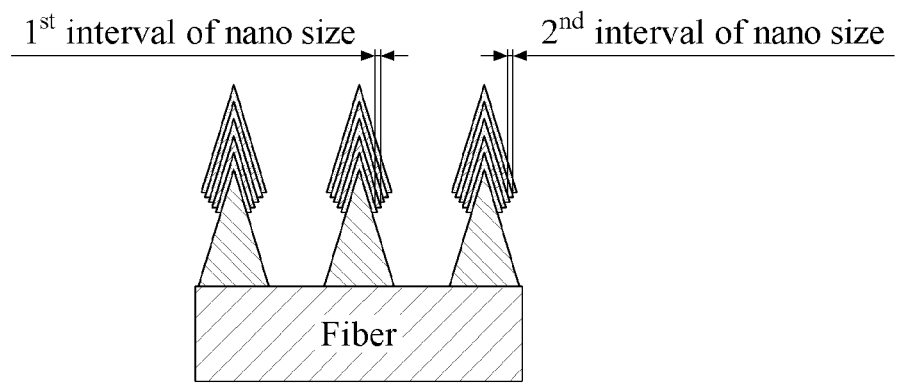
Figure 2E:
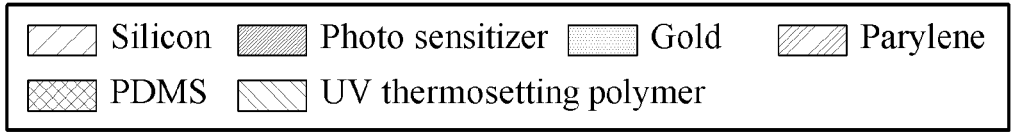

FIG. 2E illustrates another modified example of the manufacturing process of FIG. 2C.

FIG. 2E illustrates a process that proceeds after the manufacturing process of FIGS. 2A and 2B is completed. Referring to FIG. 2E, in process (9), an end of a probe is exposed through flowing of photo sensitizer. In process (10), sequential deposition, such as gold-parylene-gold, is performed to manufacture a nanostructure and an interval of a nano size. Here, gold-parylene-gold correspond to conductive layer-insulating layer-conductive layer, respectively.

In process (11), a lift-off process is performed through etching of photo sensitizer. In process (9), when the sensitizer is slowly hardened at a low temperature over a long period of time, the photo sensitizer flows down and is hardened due to a structural characteristic of the probe with a sharp tip. In process (9), the end (tip) of the probe may be exposed without dry etching.

According to FIGS. 2A to 2E, the surface plasmon resonance sensor in which the nanostructure is provided on the surface of the optical fiber as shown in FIG. 1B may be manufactured. FIGS. 2A to 2E illustrate the nanostructure including, for example, three layers (conductive layer-insulating layer-conductive layer). However, it is provided as an example only. That is, at least one nanostructure in which an interval between conductive layers is maintained at the nano size using the insulating layer may be present.

Figure 3:
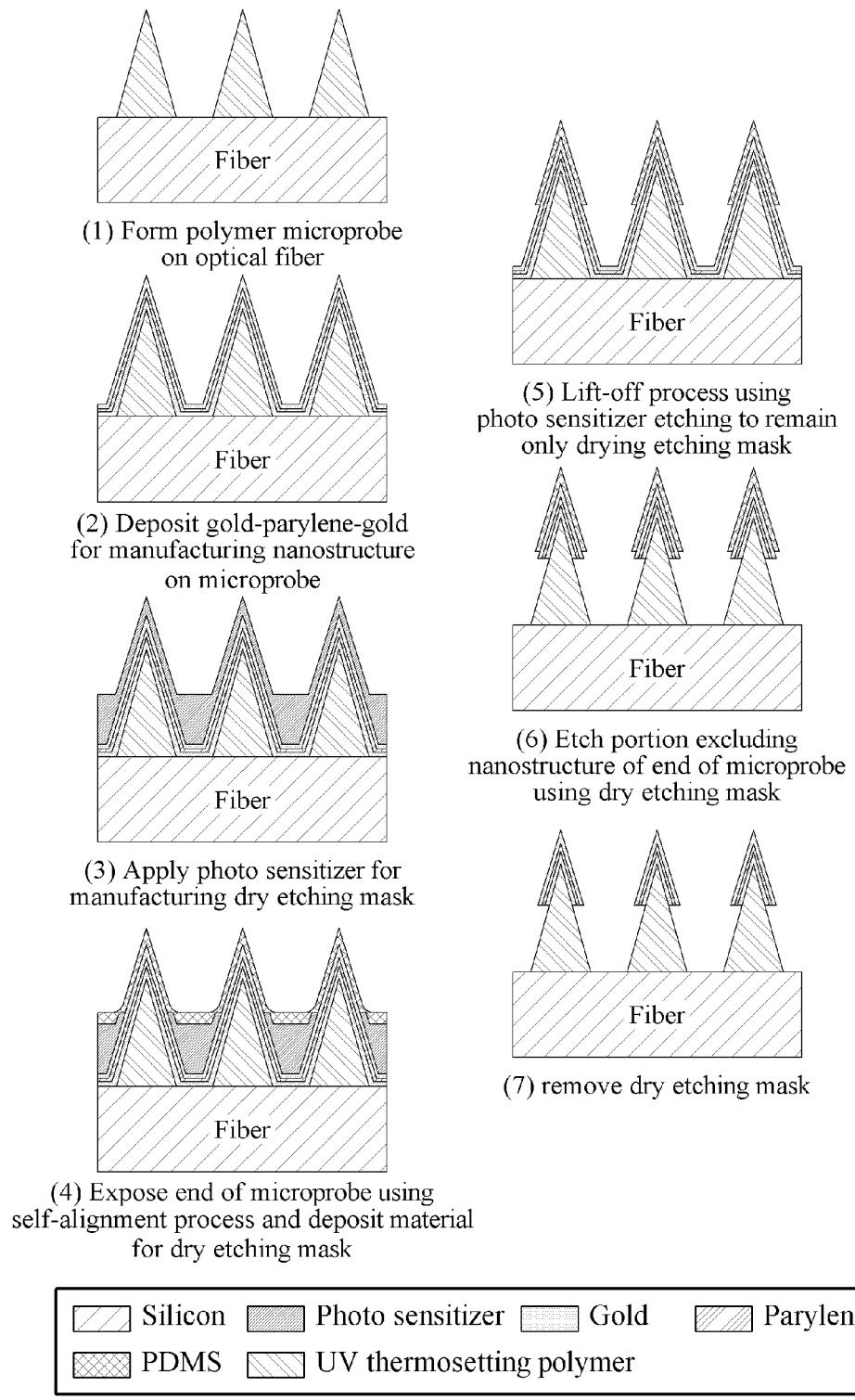
FIG. 3 illustrates a manufacturing process of a surface plasmon resonance sensor according to another example embodiment.

FIG. 3 illustrates a manufacturing process of a surface plasmon resonance sensor according to another example embodiment.

Referring to FIG. 3, in process (1), a polymer microprobe is formed on an optical fiber. In process (2), conductive layer-insulating layer-conductive layer (e.g., gold-parylene-gold) are deposited on the microprobe. In process (3), a photo sensitizer for manufacturing a dry etching mask is applied. In process (4), an end (tip) of the microprobe is exposed using a self-alignment process and a material, for example, aluminum (Al), for drying etching mask, is deposited. In process (5), a lift-off process using photo sensitizer etching is performed to remain only the dry etching mask. In process (6), a portion excluding a structure corresponding to the end of the microprobe is etched using the dry etching mask. In process (7), the dry etching mask is removed.

FIG. 3 relates to a method of using dry etching instead of a lift-off process using wet etching in the case of depositing an odd number of materials. Compared to the lift-off process, a relatively short period of process time may be used and a nanostructure manufacturing yield may be enhanced.

Figure 4:
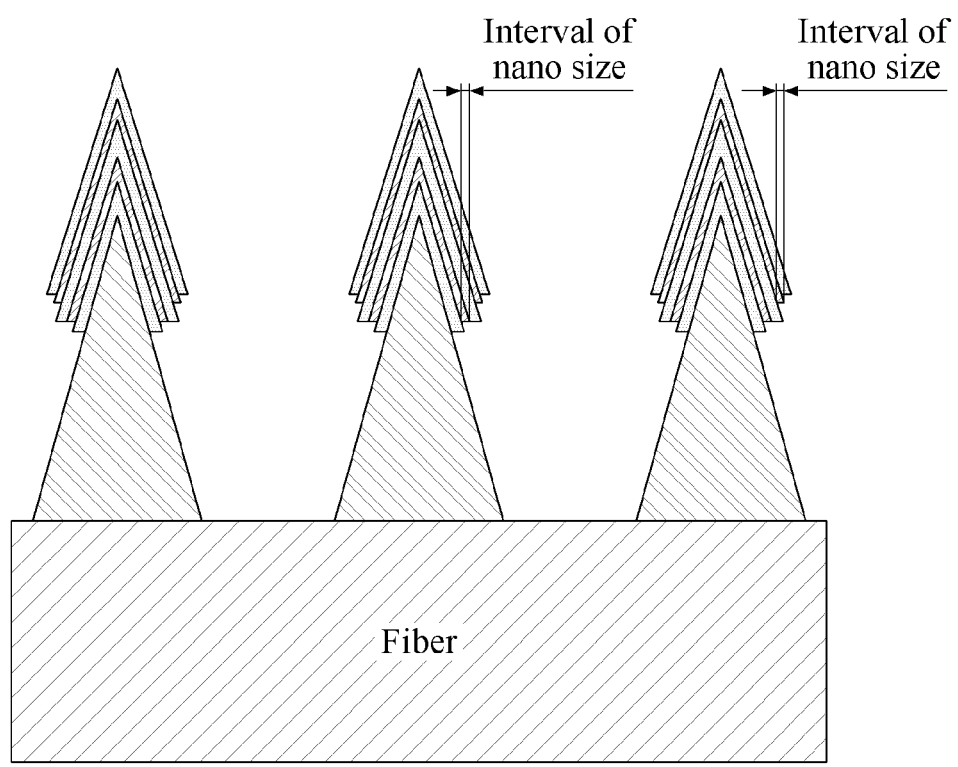
FIG. 4 is a cross-sectional view to describe a nanostructure according to an example embodiment.

FIG. 4 is a cross-sectional view to describe a nanostructure including conductive layer-insulating layer-conductive layer according to an example embodiment. Referring to FIG. 4, two nanostructures each including conductive layer-insulating layer-conductive layer are combined. That is, herein, the nanostructure may be configured in a conductive layer-insulating layer-conductive layer structure or in a conductive layer-insulating layer-conductive layer-insulating layer-conductive layer structure. Here, an interval between conductive layers may be maintained at a nano size by an insulating layer with a thickness of the nano size.

Figure 5A:
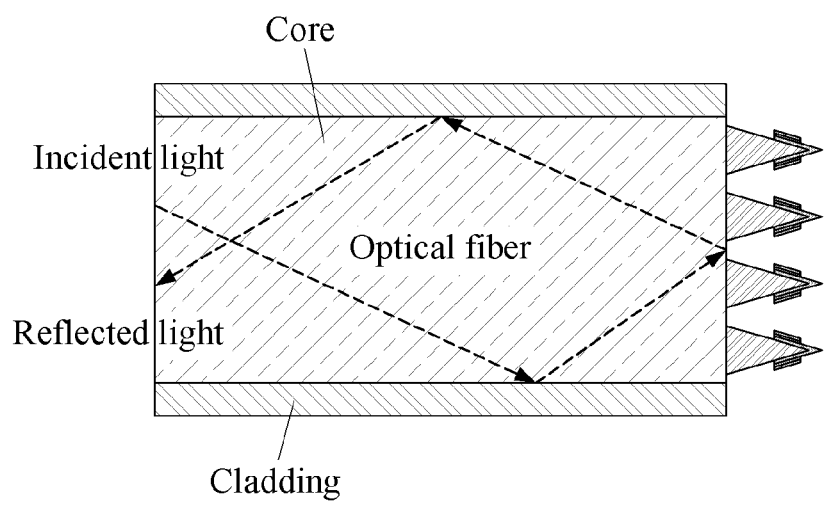
FIGS. 5A and 5B illustrate examples of light being reflected inside an optical fiber of a surface plasmon resonance sensor according to an example embodiment.
Figure 5B:
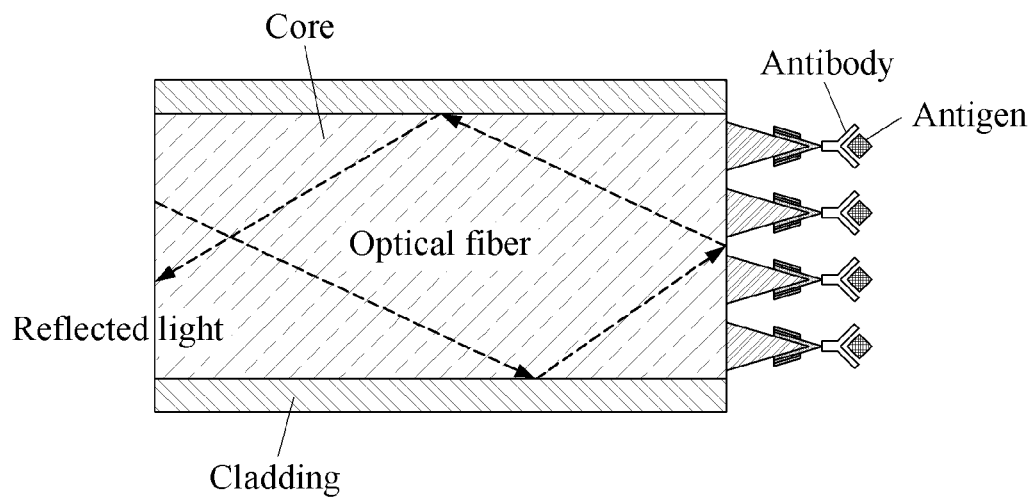

FIGS. 5A and 5B illustrate examples of light being reflected inside an optical fiber of a surface plasmon resonance sensor according to an example embodiment.

Referring to FIGS. 5A and 5B, light incident from a light source may be totally reflected inside an optical fiber and thereby move, and light output through the optical fiber may be reflected by a nanostructure disposed on the surface of the optical fiber. Related information may be acquired based on signal strength of the reflected light.

In detail, when an antibody adsorbed at an upper end of the nanostructure does not react to an antigen, signal strength of corresponding reflected light may be detected through a detector. Also, when the antibody adsorbed at the upper end of the nanostructure reacts to the antigen, signal strength of corresponding reflected light may be detected through the detector. A type of the antigen and concentration of the antigen may be predicted based on a change in the signal strength of reflected light detected through the detector.

Figure 6:
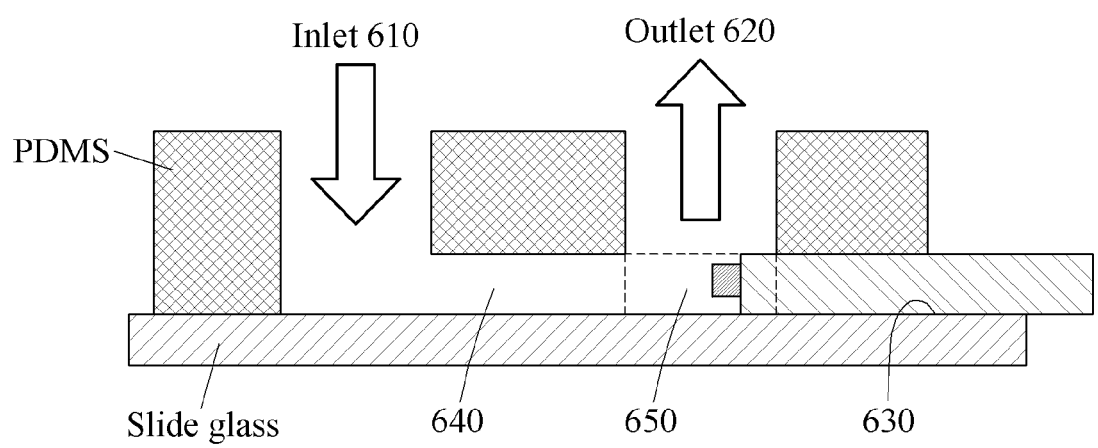
FIG. 6 illustrates a channel unit according to an example embodiment.

FIG. 6 illustrates a channel unit according to an example embodiment.

Referring to FIG. 6, a channel unit may include an inlet 610, an outlet 620, and a sensor insertion hole 630. Here, at least one inlet 610 may be present. For example, an antigen injection inlet, a BSA (Bovine Serum Albumin) injection inlet, a buffer injection inlet, and an antibody injection inlet may be separately present with respect to the channel unit. Also, the outlet 620 through which the injected solution is discharged may be separately present. Alternatively, only a single outlet 620 may be present.

The sensor insertion hole 630 may be a position at which a surface plasmon resonance sensor inserts. Once the surface plasmon resonance sensor inserts through the sensor insertion hole 630, a microprobe that is provided at an end of a core layer of an optical fiber in the surface plasmon resonance sensor is positioned inside a microfluidic channel 640. That is, as the surface plasmon resonance sensor inserts through the sensor insertion hole 630, the nanostructure provided in a specific region of the microprobe may be provided inside the microfluidic channel 640.

The microfluidic channel 640 may connect the inlet 610 and the outlet 620, and the microfluidic channel 640 may be connected to a reaction chamber 650. Solution may move in order of inlet 610-microfluidic channel 640-reaction chamber 650-outlet 620. The reaction chamber 650 may be connected to at least one sensor insertion hole 630. When a front end of the surface plasmon resonance sensor inserted into the sensor insertion hole 630 is exposed, solution within the reaction chamber 650 may be in contact with an end of the optical fiber of the surface plasmon resonance sensor. Here, in the surface plasmon resonance sensor, the microprobe may be provided at the end of the optical fiber and the nanostructure may be provided in a specific region of the microprobe. Accordingly, the solution may be in contact with the nanostructure.

The surface plasmon resonance sensor in which the nanostructure is provided on the surface of the optical fiber as shown in FIGS. 1A and 1B may insert into the sensor insertion hole 630. The nanostructure positioned at the end of the surface plasmon resonance sensor is exposed at the microfluidic channel 640.

An antibody may be combined with the nanostructure. When an antigen is injected through the inlet 610, the antigen may be injected into the reaction chamber 650 through the microfluidic channel 640 and react to the antibody bound with the nanostructure in the reaction chamber 650. In response to a reaction between the antibody and the antigen, light passing through the optical fiber may be reflected and detected at the detector and a type of the antibody and an antigen amount may be determined based on a change in strength of reflected light.

Figure 7:
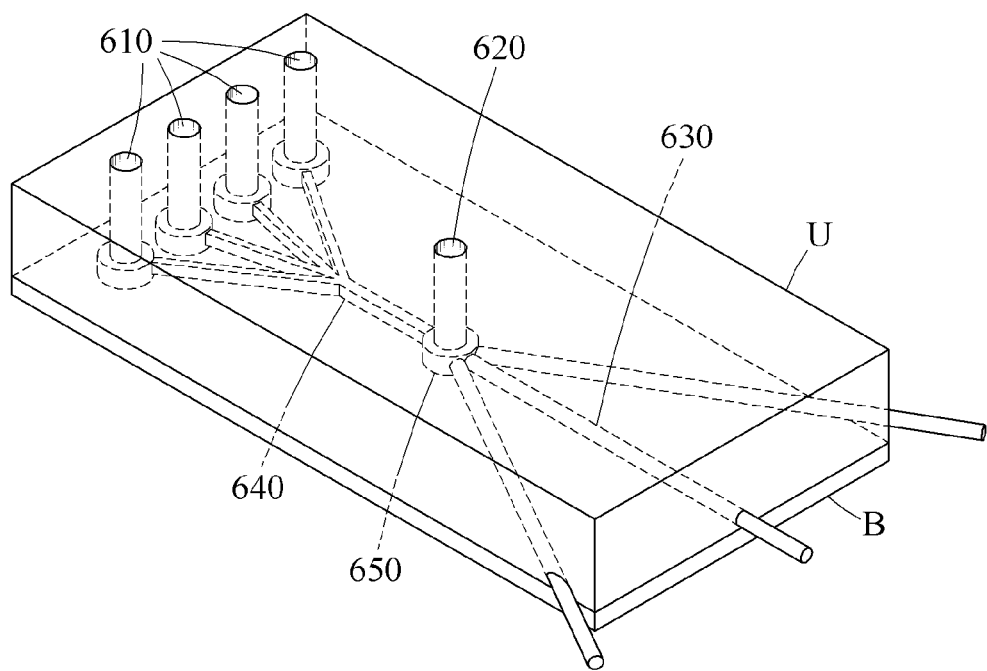
FIG. 7 is a perspective view of a channel unit according to an example embodiment.

FIG. 7 is a perspective view of a channel unit according to an example embodiment.

Referring to FIG. 7, the channel unit may include at least one inlet 610, the outlet 620, the sensor insertion hole 630, the microfluidic channel 640, and the reaction chamber 650. The description of FIG. 6 may apply to the channel unit of FIG. 7. FIG. 7 is a perspective view of the channel unit of FIG. 6. In FIG. 7, U denotes an upper layer formed through molding and B denotes a lower layer of glass. Here, the inlet 610, the outlet 620, the sensor insertion hole 630, the microfluidic channel 640, and the reaction chamber 650 may be formed in the upper layer U.

As described above, the surface plasmon resonance sensor according to an example embodiment inserts into the sensor insertion hole 630. An antibody combined with a nanostructure that is provided at an end of an optical fiber of the surface plasmon resonance sensor may react to an antigen that is contained in solution injected into the inlet 610 and flowing out through the outlet 620.

Hereinafter, a manufacturing process of the channel unit of FIG. 7 is described. An embossed structure mask may be formed on a silicon substrate using a photolithograph process. The embossed structure mask may be photoresist or another element. A mold in an embossed structure in which the embossed structure mask is removed may be formed by etching the silicon substrate. Here, the mold may include an embossed structure for the inlet 610, the outlet 620, the reaction chamber 650, the microfluidic channel 640, and the sensor insertion hole 630.

Hydrophobic processing may be performed on the embossed structure surface of the mold. Here, the hydrophobic processing may represent performing FC coating on the surface or performing silane processing to hydrophobically enhance the surface without separate hydrophobic coating. When the mold is applied with polymer such as PDMS and hardened, a structure in which an embossed structure is fabricated to an engraved structure may be acquired from the mold. The inlet 610, the outlet 620, and the sensor insertion hole 630 may be formed by performing a punching process on the opposite surface of the surface on which the engraved structure is formed.

Figure 8A:
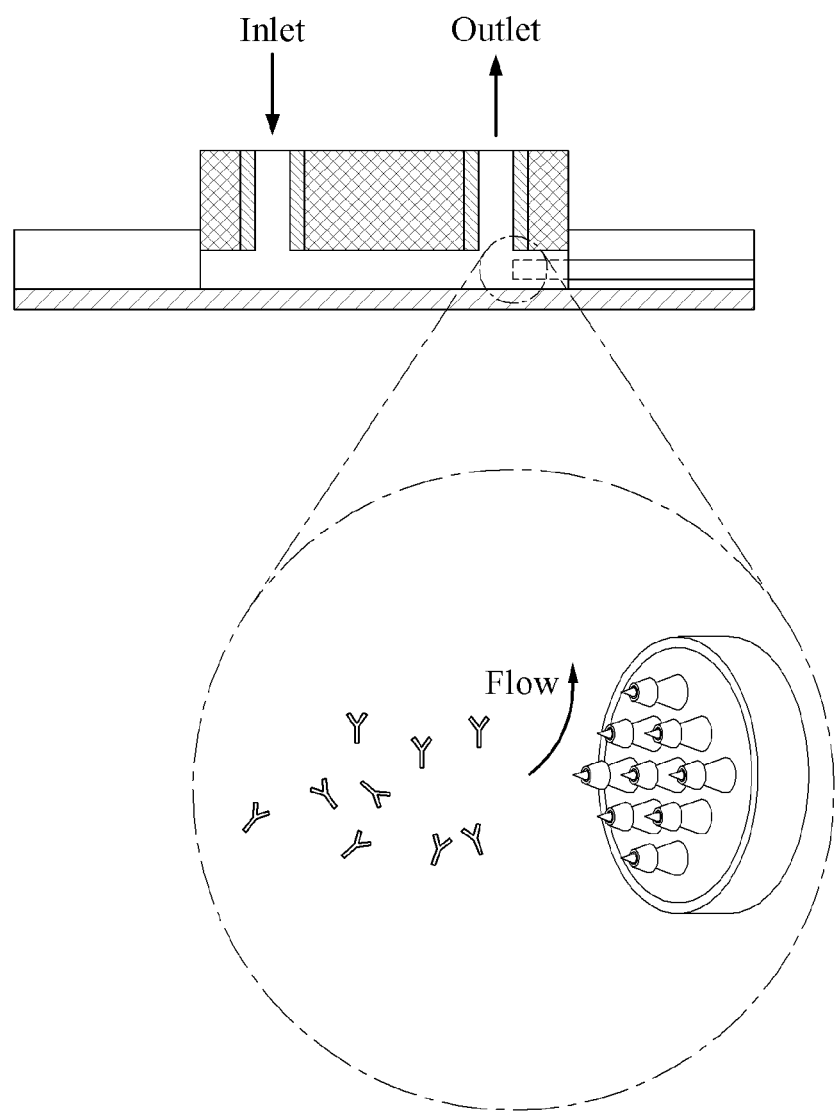
FIG. 8A illustrates an example in which a sensor insertion hole is horizontally formed according to an example embodiment.
Figure 8B:
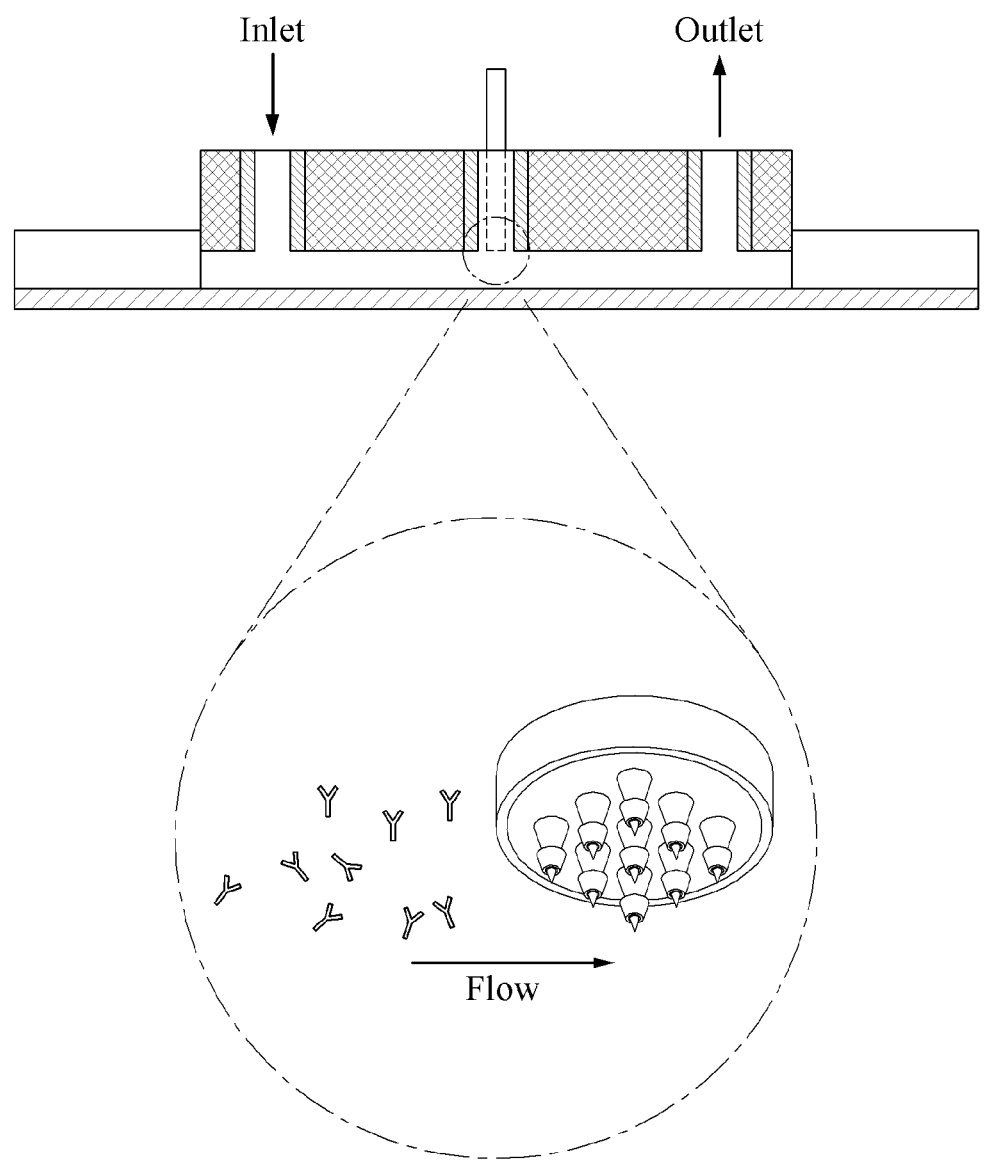
FIG. 8B illustrates an example in which a sensor insertion hole is vertically formed according to an example embodiment.

FIG. 8A illustrates an example in which a sensor insertion hole is horizontally formed according to an example embodiment, and FIG. 8B illustrates an example in which a sensor insertion hole is vertically formed according to an example embodiment. Using the sensor insertion hole through which a surface plasmon resonance sensor inserts, the surface plasmon resonance sensor may horizontally insert into the channel unit as shown in FIG. 8A or may vertically insert into the channel unit as shown in FIG. 8B. FIGS. 8A and 8B illustrate various examples of the sensor insertion hole through which the surface plasmon resonance sensor inserts. In addition to positions of the sensor insert holes shown in FIGS. 8A and 8B, other example embodiments may also be included in the scope of the invention.

Figure 9:
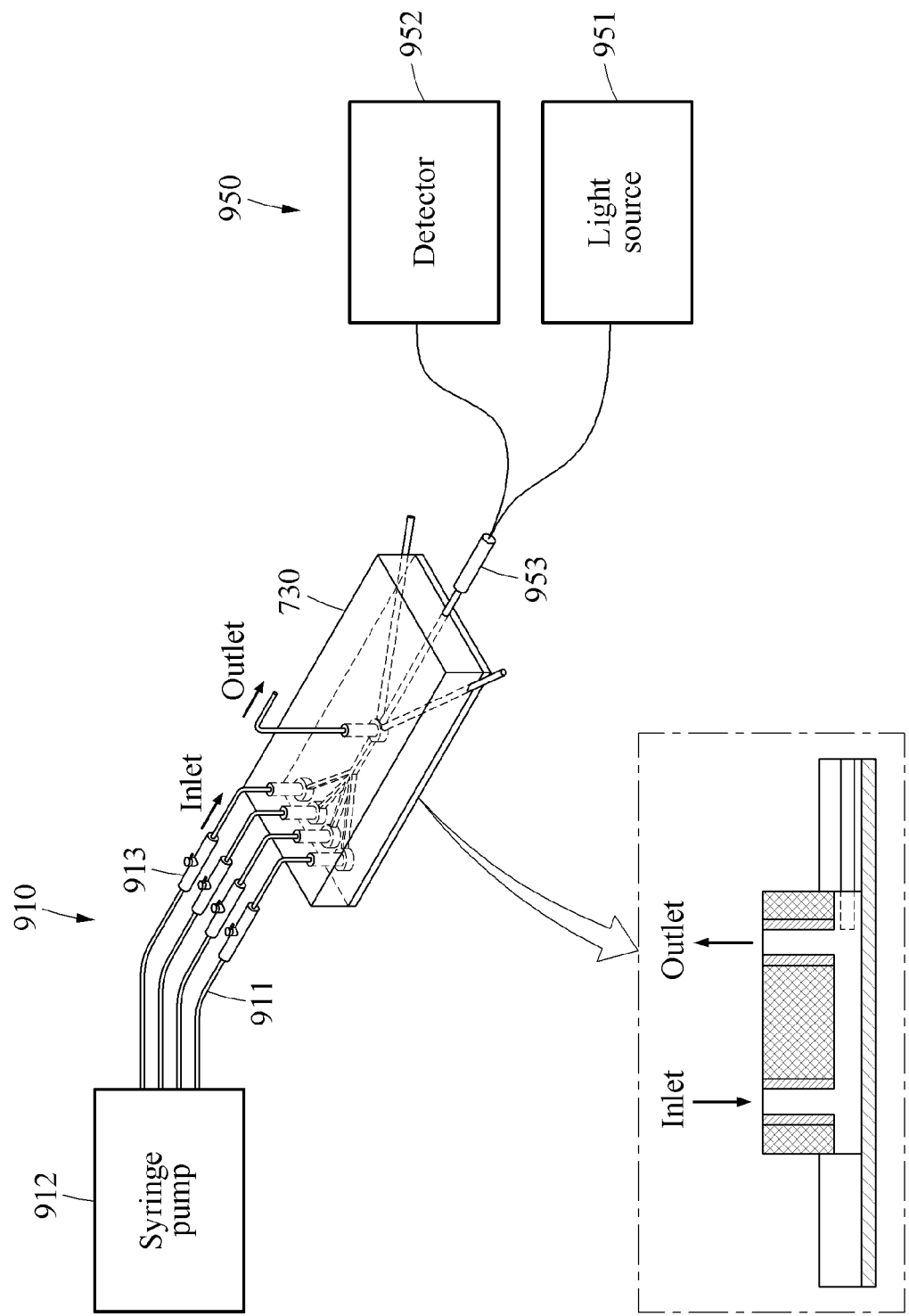
FIG. 9 illustrates a system using a surface plasmon resonance sensor according to an example embodiment.

FIG. 9 illustrates a system using a surface plasmon resonance sensor according to an example embodiment.

Referring to FIG. 9, the system may include a solution supply device 910, a channel unit 730, and an optical measurer 950. Here, the channel unit 730 may include an inlet, an outlet, a microfluidic channel, a sensor insertion hole, and a reaction chamber.

The solution supply device 910 may include a tube portion 911 of which one end is connected to each corresponding inlet of the channel unit 730 and a pump portion 912 connectable at another end of each tube portion 911. The pump portion 912 may be, for example, a syringe pump and may be connectable to each tube 911. Accordingly, solution may be injected into each inlet. A shut-off valve 913 configured to open and close a tube is installed at each corresponding tube and may prevent solution being injected into a current tube from flowing in another tube.

The optical measurer 950 may include a light source 951 and a detector 952. The light source 951 and the detector 952 may be connected at a rear end of the surface plasmon resonance sensor in an n:1 multimode through an optical fiber coupler 953. Although a single optical measurer 950 is illustrated in FIG. 9, a plurality of optical measurers 950 may be connected to a plurality of surface plasmon resonance sensors, respectively.

The light source 951 may apply excitation light. A structure of connecting a plurality of optical fiber couplers 953 or a single multi-branched optical fiber to the light source 951 may be employed. The detector 952 is configured to detect a signal generated from the surface plasmon resonance sensor. A single detector 952 or a number of detectors 952 corresponding to a number of optical fiber couplers 953 may be provided. The optical fiber coupler 953 may connect the surface plasmon resonance sensor, the light source 951, and the detector 952 using an optical fiber welder.

Light emitted from the light source 951 may be incident up to an end of the surface plasmon resonance sensor along the optical fiber coupler 953, may generate a surface plasmon resonance reaction on the surface, and then be reflected and return. The detector 952 may receive the reflected light and may measure strength of the reflected light.

According to an example embodiment, when different antibodies are introduced to nanostructures in which a surface plasmon resonance phenomenon occurs at different wavelengths within a microfluidic channel, it is possible to detect strength of a corresponding wavelength or a positional change through peculiar binding with an unknown disease (antigen). Therefore, a cause of the disease may be specified with only a one-time measurement. Also, the example embodiments may apply to a diagnostic biosensor requiring a relatively high sensitivity and throughput since an amount of materials to be analyzed is very small and a plurality of tests needs to be performed to specify the disease at an initial disease stage. Also, the example embodiments may apply to a point of care (POC) and an early-diagnostic field by employing a structure in which different antibodies are introduced to nanoparticles in which a surface plasmon resonance phenomenon occurs at different wavelengths and thereby quickly tracing diseases of a plurality of patients at a time.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A surface plasmon resonance sensor comprising:
an optical fiber; and
at least one nanostructure provided at a position separate by a predetermined distance from an end of the optical fiber,
wherein the nanostructure comprises a conductive layer and an insulating layer, and
wherein, in the nanostructure, the conductive layer is provided at an interval of a nano size at each of both sides of the insulating layer.

2. The surface plasmon resonance sensor of claim 1, wherein a microprobe is provided at the end of the optical fiber, and the nanostructure is provided in a specific region of the microprobe.

3. The surface plasmon resonance sensor of claim 2, wherein the specific region is at a position separate by the predetermined distance from the end of the optical fiber.

4. The surface plasmon resonance sensor of claim 1, wherein the nanostructure is positioned in a specific region of the microprobe provided at an end of a core layer of the optical fiber.

5. A surface plasmon resonance sensor comprising:
an optical fiber;
a microprobe provided at an end of the optical fiber; and
a nanostructure provided in a specific region of the microprobe,
wherein the specific region of the microprobe is present at a position separate by a predetermined distance from the end of the optical fiber, and
in the nanostructure, a conductive layer is provided at an interval of a nano size at each of both sides of an insulating layer.

6. The surface plasmon resonance sensor of claim 5, wherein the microprobe is provided in a core layer at the end of the optical fiber.

7. A measurement apparatus comprising:
at least one inlet and at least one outlet; and
a surface plasmon resonance sensor provided to the inlet and the outlet,
wherein the surface plasmon resonance sensor comprises:
an optical fiber;
a microprobe provided at an end of the optical fiber; and
a nanostructure provided in a specific region of the microprobe present at a position separate by a predetermined distance from the end of the optical fiber,
wherein the nanostructure comprises an insulating layer and a conductive layer, and
the conductive layer is provided at an interval of a nano size at each of both sides of the insulating layer.

8. The measurement apparatus of claim 7, wherein the microprobe is provided in a core layer at the end of the optical fiber.

* * * * *